Nov. 30, 1965   F. J. LUKETA   3,220,137
NON-SNAGGING SHACKLE COUPLERS FOR TRAWL NETS
Filed April 17, 1963   5 Sheets-Sheet 3
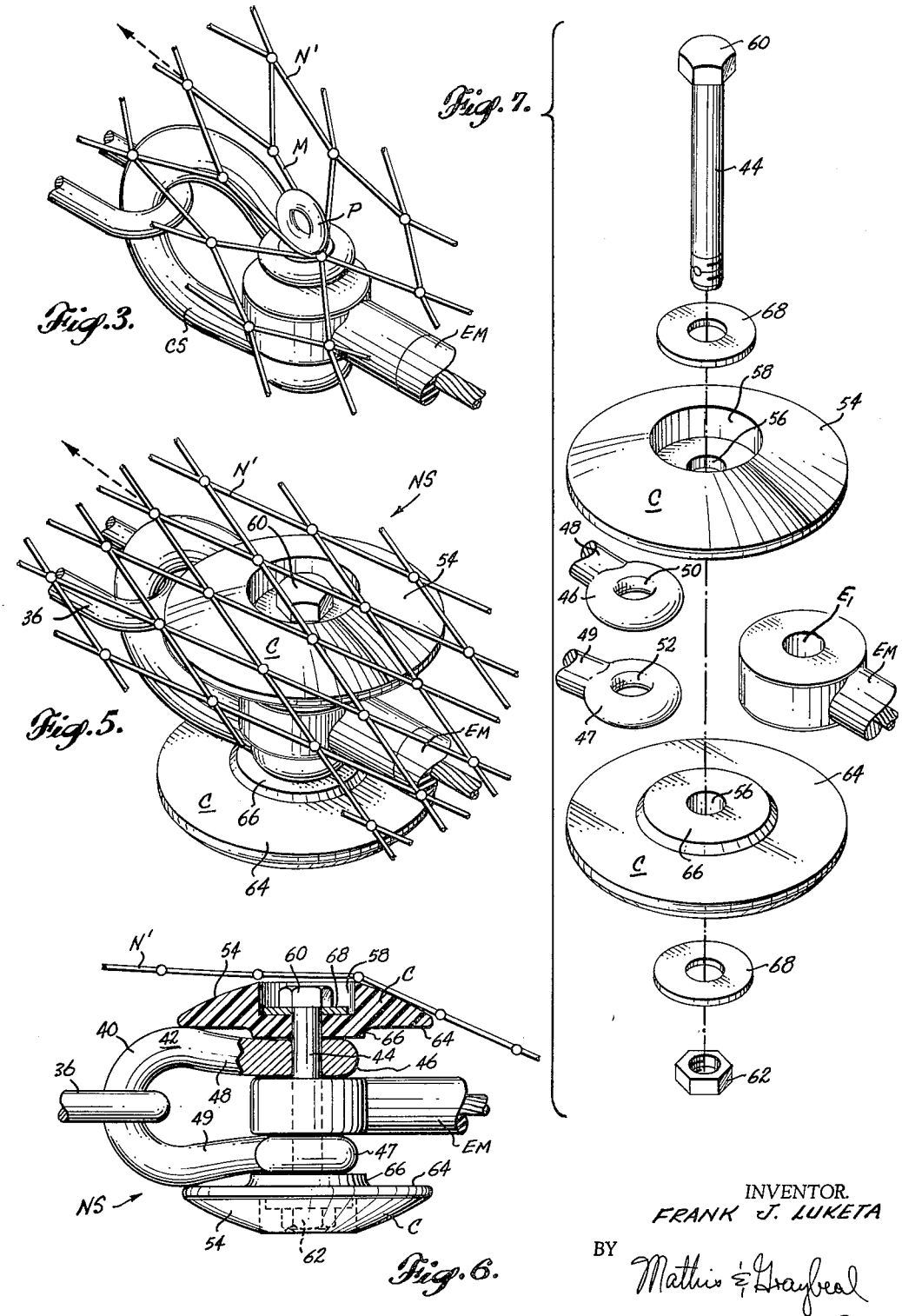
INVENTOR.
FRANK J. LUKETA
BY Mathis & Graybeal
ATTORNEYS

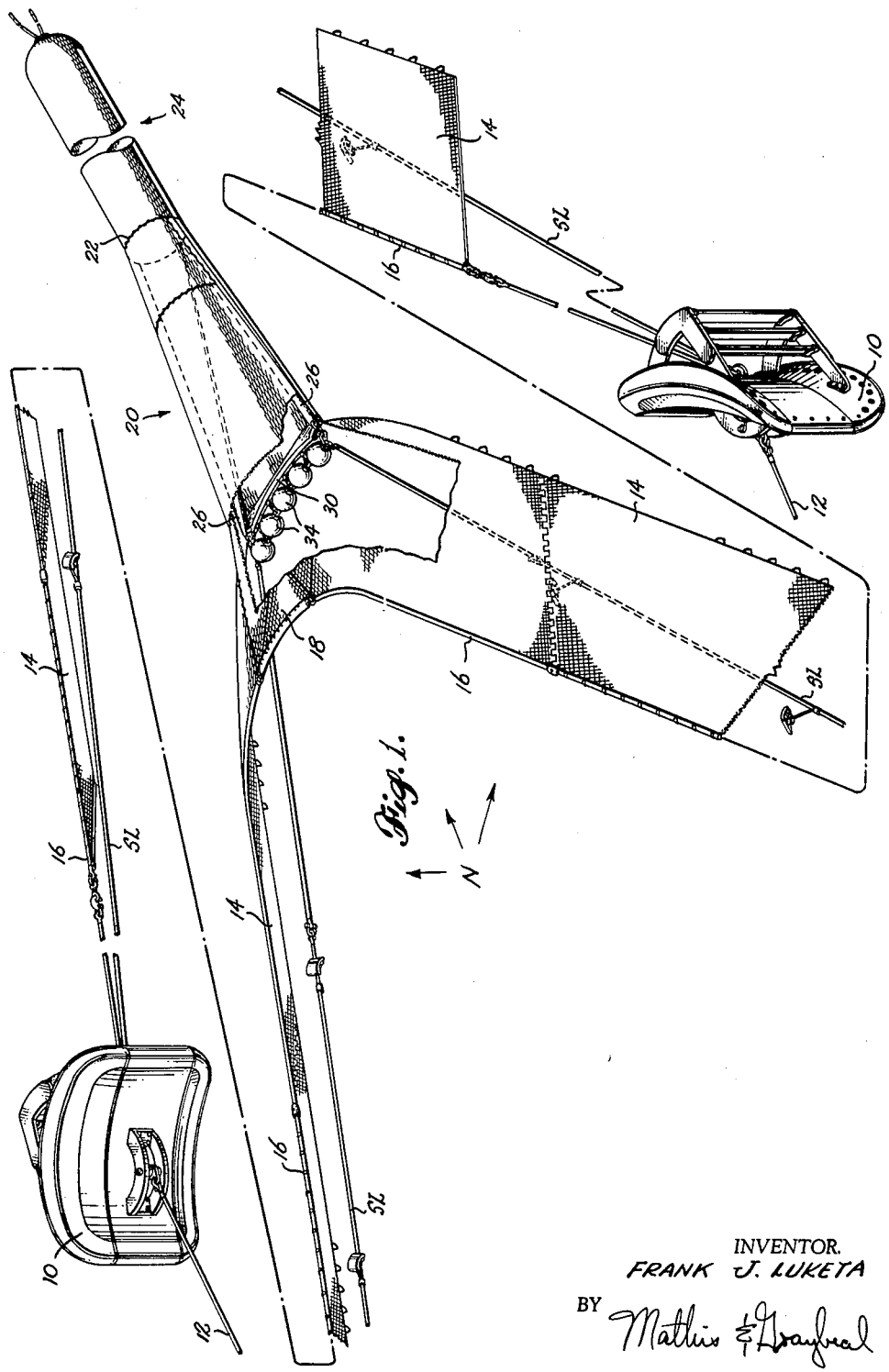

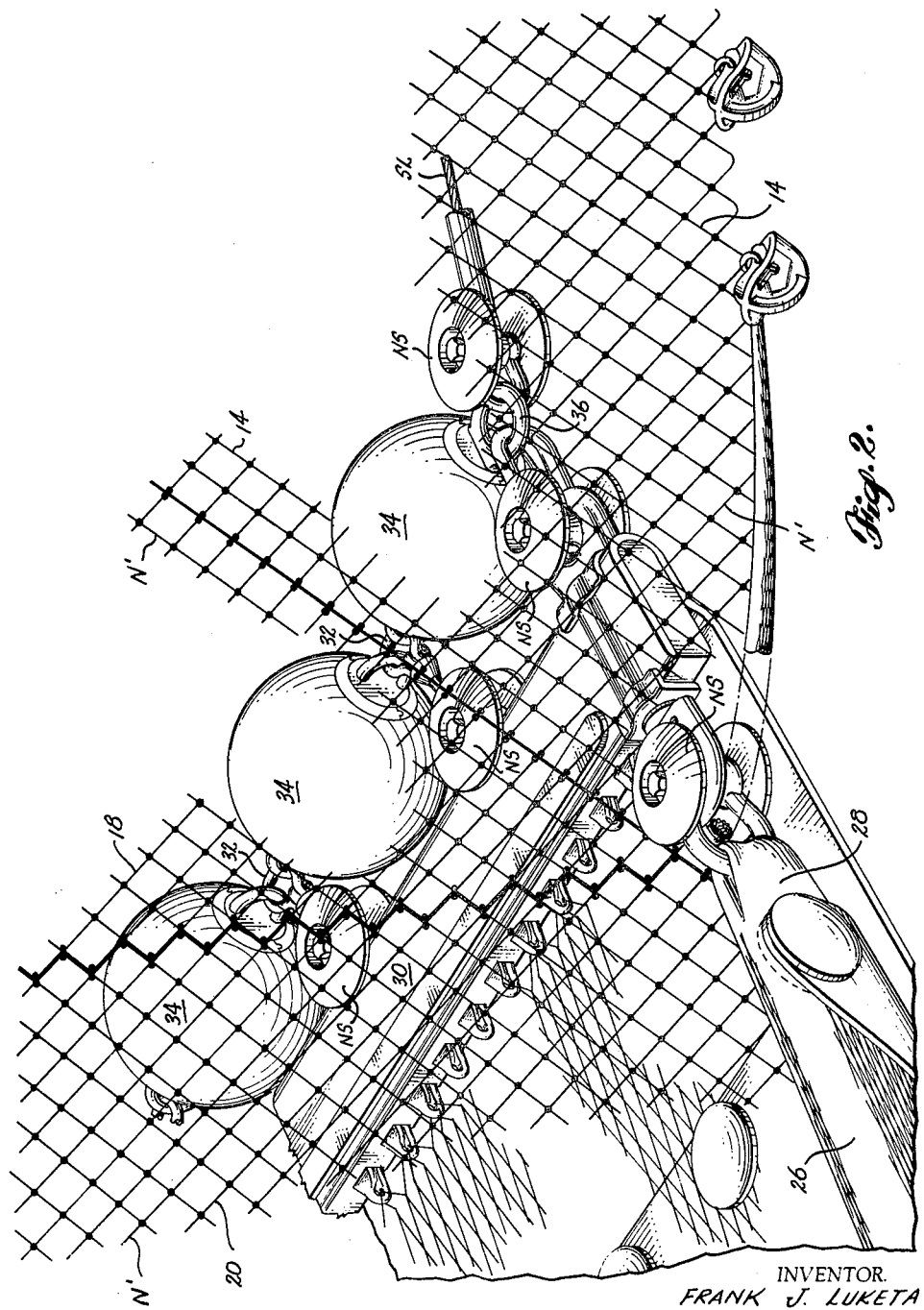

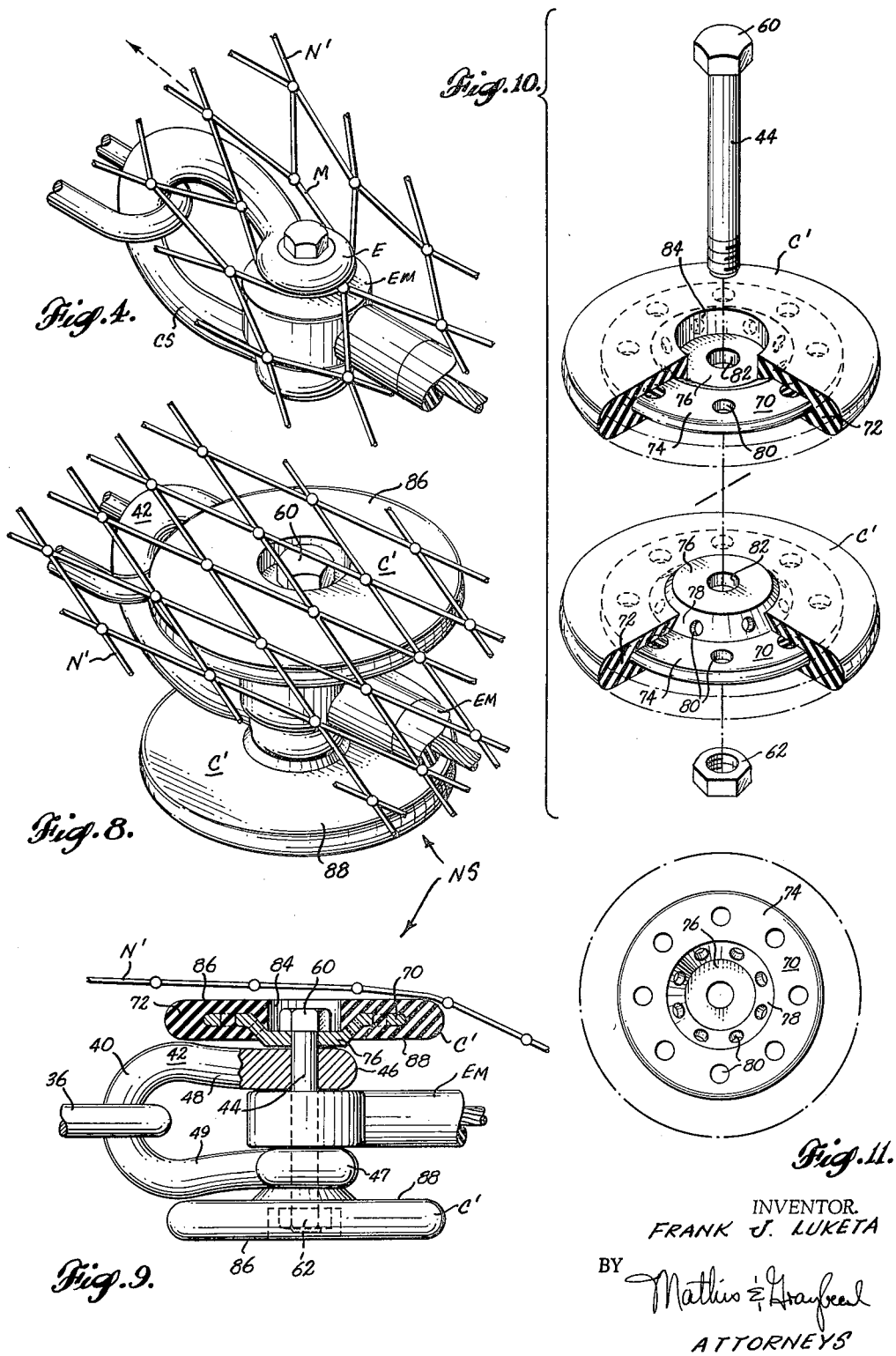

Nov. 30, 1965 F. J. LUKETA 3,220,137
NON-SNAGGING SHACKLE COUPLERS FOR TRAWL NETS
Filed April 17, 1963 5 Sheets-Sheet 5

INVENTOR.
FRANK J. LUKETA
BY
ATTORNEYS

United States Patent Office 3,220,137
Patented Nov. 30, 1965

3,220,137
NON-SNAGGING SHACKLE COUPLERS FOR TRAWL NETS
Frank J. Luketa, 5567 Greenwood Ave. N., Seattle 3, Wash.
Filed Apr. 17, 1963, Ser. No. 273,617
12 Claims. (Cl. 43—9)

This is a continuation-in-part of my application Serial No. 252,089, filed Jan. 17, 1963, and now U.S. Patent No. 3,162,967.

The present invention relates to non-snagging shackle couplers especially designed for use in installations wherein a net or like object of reticular (i.e. having veins or fibers crossing like a network, of open mesh) construction is drawn over or otherwise put in relative moving contact with the couplers of the installation.

By way of typical and therefore non-limitive example, non-snagging shackle couplers characteristic of the present invention have a special utility respecting trawl net suspension arrangements, wherein various suspension elements are coupled together and to a portion of the trawl net at a region surrounded on top and at the sides by additional portions of the said net, and wherein during use or during certain handling operations of the net the portions thereof make relative moving contact with the suspension elements and the couplers. An arrangement such as has just been described as disclosed in my Patent No. 3,162,967.

Conventional shackle couplers, which are commonly used in commercial fishing net installations, have projecting parts that are smaller in size than the meshes of a trawl net. For this reason conventional shackles cannot be satisfactorily employed in fishing net installations wherein moving contact sometimes occurs between the net and the couplers, such as in the aforementioned trawl net suspension arrangement, for example, because the meshes of the net snag on the said projecting parts of the conventional shackle, causing the net to foul and/or tear. If such fouling occurs during the placing or setting of the net in the water, the net will not assume its normal in use position in the water, and/or the netting will be ripped and must be hauled back aboard the fishing vessel to be repaired and/or unsnagged and then the net again set. A principal object of the present invention is to provide a novel shackle coupler that is snag-proof and, hence, will not cause fouling or tearing of the net, and which will obviate additional handling of and/or repairing of the net.

In essence, the non-snagging shackle coupler characteristic of the present invention comprises the assemblage together of one or two shackle caps of substantial diameter, and constructed in accordance with the present invention, and the generally U-shaped yoke portion of a conventional shackle, with a nut and bolt being used to secure the assembly together, and with the bolt performing the function of the shackle pin. If the orientation of the shackle assembly and the net are such that the net, while in use or while handling, only contacts one side of the coupler, a single shackle cap situated on the net side of the coupler is probably all that is necessary, otherwise a shackle cap should be provided on both sides of the coupler. One specific form of shackle cap according to the present invention is characterized by a smooth, convex shaped outboard side, rounded peripheral edges, a stepped, generally bi-planar inboard side, a central bolt receiving opening, and a depression or well in said outboard side, situated generally concentric with said opening, for countersinking the head or nut end of the bolt, whichever the case may be, below the surface of said outboard side. Preferably, this form of shackle cap is constructed entirely of nylon or a similar tough, abrasion resistant material.

Specific variations of shackle cap construction according to the invention include a shackle cap having a generally disk-shaped metal core and a jacket or cover of rubber or similar material covering said core. Preferably in this form of the invention, a plurality of circumferentially spaced openings are provided in the core and the jacket of rubber or like material is bonded in situ onto said core, with a portion of the jacket material extending through said openings and connecting the two sides of the jacket together, at the location of the openings, for the purpose of better securing the jacket onto said core.

Characteristics common to each disclosed form of shackle cap according to the present invention include a smooth surface on the outboard side of the cap, interrupted only by the central depression for countersinking the head or nut end of the bolt, smoothly curved peripheral edges and a diameter larger than the longer dimension of the elongated, substantially diamond-shaped meshes of a net that is stretched in one direction and contracted or collapsed in the crosswise direction. Thus, the shackle caps of the present invention are constructed so as to neither snag nor chafe the net when moving contact occurs therebetween, as for example, in the trawl net hauling method of my copending application entitled Drum Trawling Method and Apparatus, Serial No. 269,691, filed April 1, 1963.

These and other characteristics and features, objects and advantages of the present invention will be apparent from the following description of certain typical embodiments thereof, taken together with the accompanying illustrations wherein like letter designations and like numerals refer to like parts, and wherein:

FIG. 1 is a perspective view presented as three related sections, illustrating a bottom trawl net layout, with the net broken away in the region above a suspension bar and its associated elements;

FIG. 2 is an enlarged fragmentary perspective view of the region adjacent one end of the suspension bar, as viewed from an aspect opposite to the view of FIG. 1, such view illustrating non-snagging shackles, constructed in accordance with the present invention, used to secure a net suspender and a bobbin line to the suspension bar and one end of a sweep line to an end of said bobbin line;

FIG. 3 is a fragmentary perspective view, on an enlarged scale of a net snagged on the outstanding pin portion of a conventional shackle;

FIG. 4 is a fragmentary perspective view of a net snagged in the recess formed between an eye portion of a conventional shackle and an apertured element employed therewith.

FIG. 5 is a fragmentary perspective view similar to FIGS. 3 and 4, presenting an instantaneous showing of the net while in moving contact with a non-snagging shackle coupler constructed in accordance with the present invention, such view illustrating the non-snagging protection provided by the cap in contact with the net;

FIG. 6 is an elevational view of a non-snagging shackle coupler assembly of the present invention, showing the non-snagging and non-chafing contact existing between the net and the cap which it contacts, and also illustrating the cross-sectional configuration of one form of shackle cap according to the present invention;

FIG. 7 is an exploded perspective view of the non-snagging shackle coupler assembly of FIGS. 5 and 6;

FIG. 8 is a fragmentary perspective view similar to FIG. 5, but showing a modified form of shackle cap;

FIG. 9 is a side elevational view of the non-snagging shackle assembly of FIG. 8, illustrating the cross-sectional configuration of the modified form of shackle cap;

FIG. 10 is an exploded perspective view of the non-snagging shackle assembly of FIGS. 8 and 9, with the generally U-shaped coupling element and the eye member omitted;

FIG. 11 is a plan view looking toward the inboard side of the shackle cap form shown in FIGS. 8–10, such view presenting the generally disk-shaped core member of such form in solid lines and merely indicating by a circular broken line the general outline of the cover or jacket portion of such form;

Figure 14:
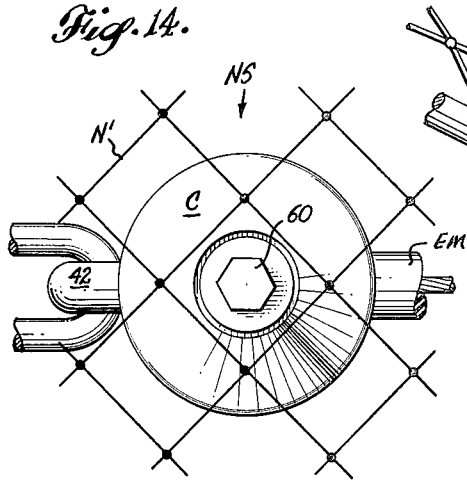
Figure 15:
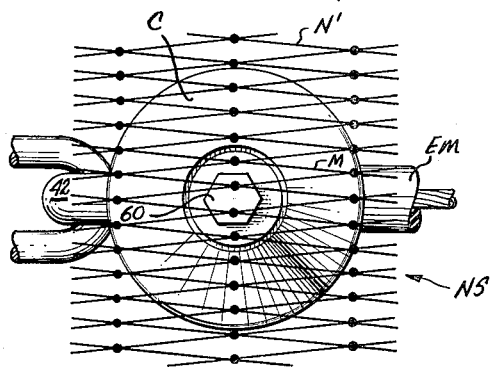

FIG. 14 is a fragmentary top plan view of a net fully distended or relaxed, when the meshes are square in shape, overlying a non-snagging shackle coupler of the present invention; and FIG. 15 is a fragmentary plan view similar to the view of FIG. 14, but showing the net elongated in one direction and contracted in the crosswise direction so that the meshes take the shape of elongated diamonds, such view serving to illustrate the relationship of the diameter of a cap with the longer dimension of a collapsed mesh.

Referring more specifically to FIG. 1, the bottom trawl net layout illustrated thereby includes a trawl door 10 at each side of a net N, which doors are dragged forwardly over the ocean bottom by towing warps 12 extending outwardly and aft from a trawler (not shown). The doors 10 spread apart curtains 14 which depend from curtain line 16. The after ends of curtains 14 connect to the upper mesh panel 18 of a funnel 20, which in turn is connected at 22 with the codend 24 of the net N. Suspenders 26 constructed of mesh material are located on each side of and in effect constitute parts of the funnel 20. At their respective forward ends the suspenders 26 are each gathered together and formed into loops 28 by which they are secured to the respective ends of the suspension bar 30. Through the suspension bar 30 and several connecting elements, hereinafter to be described, the forward or looped ends 28 of the suspenders 26 each connect with a sweep line SL which in turn is anchored onto a door 10. The sweep lines SL through the suspenders 26 assume the drag of the codend 24 and its catch.

Referring now to FIG. 2, a transverse bobbin line 32, of link construction, extends in front of the suspension bar 30 and at spaced apart intervals is joined thereto by non-snagging shackles NS, constructed in accordance with the present invention. Bobbins 34 are mounted to rotate on bobbin line 40 while the net is being dragged over the bottom. Non-snagging shackles, constructed in accordance with the present invention, are also used to connect suspenders 26 to suspension bar 30 and one end of sweep line SL to a ring 36 located on the end of bobbin line 32.

In FIG. 2 portions of funnel 20, the overhang 18 and a curtain 14 are illustrated in the foreground. During various stages of the handling of the trawl net N, such as during its placement into and removal from the water, for example, these portions of the net, generally designated N', come in moving contact with the various suspension elements, including the non-snagging shackles NS. Thus, the suspension arrangement of FIG. 2 represents a typical installation in which the non-snagging shackles NS of the present invention can be advantageously employed to prevent undesirable snagging.

FIGS. 3 and 4 typify snagging conditions that are apt to occur when the netting N' makes relative moving contact with a conventional shackle coupler CS. In FIG. 3, a mesh M of netting N' is shown snagged on the outstanding eye portion of a conventional shackle pin P, with such condition preventing further movement and/or tearing of the net N in the direction of pull of the netting N', as indicated by the arrow. In FIG. 4 the trailing strands of a mesh M are illustrated snagged in the recess formed between eye portion E of the conventional shackle CS and a single eye member EM, swagged onto the end of a line. In each of the depicted situations snagging occurs because the snagged mesh M is larger in size than the projecting portion of conventional shackle CS on which it snagged. In the non-snagging shackle assemblies NS of the present invention the shackle caps C and C', representing the two forms, constitute the outermost projecting parts of the assemblies and are intentionally made larger in diameter than the largest obtainable inside dimension of a mesh M (FIG. 15), so net snagging cannot occur.

Turning to a specific consideration of the form of non-snagging shackle coupler NS shown in FIGS. 5–7, the view of FIG. 6 is of a typical use of such non-snagging shackle coupler for joining together a bobbin line end ring 36 and an eye member EM swagged onto one end of a sweep line SL, for example. In use, of course, one segment to be coupled, such as ring 36, is engaged by the generally semi-annular bight end 40 of the generally U-shaped yoke 42, and the other segment to be coupled, such as eye member EM engages the shackle pin, shown in the form of a bolt 44. Yoke 42 is preferably identical in construction to the similarly shaped element of a conventional shackle, such as those shown in FIGS. 3 and 4, for example, because such an element is readily available on the market and would require no special manufacturing. The terminal end portions 46, 47 of the arms 48, 49 of yoke 42 define between them a jaw into which the eye $E_1$ of eye member EM extends. The openings or eyes 50, 52 (FIG. 7) in end portions 46, 47 are coaxially aligned with each other and with the opening or eye $E_1$ in eye member EM. A shackle cap C is disposed outboard of either one or both of the eye portions 46, 47, depending upon the orientation of coupler NS relative to the netting N', as heretofore explained, and such cap or caps C are removably secured in place by the bolt 44.

Each shackle cap C is generally disk-shaped, and presents a smooth, preferably convexly shaped outboard side 54 against which contact with the net is made. A central opening 56 is provided for the reception of bolt 44, and when assembled such opening 56 is coaxially related with the openings 50, 52 and $E_1$. A depression 58 is formed in the outboard side 54 generally concentric with opening 56. The depression 58 serves to countersink either the head end 60 or nut end 62 of bolt 44, whichever the case may be. Of course, the head 60 and nut 62 serve as retaining elements to hold the entire assembly together. The inboard side 64 of shackle cap C is of stepped planar configuration with the central portion or boss 66 serving as a filler to space the peripheral portion of inboard side 64 out to where it is not interfered with by U-shaped yoke member 42 as it widens towards its bight end 40. The peripheral edges of shackle cap C are preferably rounded so that they do not chafe the net. Also, shackle cap C is preferably constructed entirely from nylon or some other tough, wear-resistant material, and so that neither the bolt head 60 nor the nut 62 will bite into such material in the floor regions of the depressions 58, washers 68 are interposed between the said floor regions and the bolt head 60 and nut 62.

FIGS. 8–10 serve to illustrate a variation in construction of the shackle cap. Such modified form of shackle cap, designated cap C', is characterized by a generally disk-shaped metal core 70 and a jacket or cover 72, constructed of rubber, neoprene, or a like material. Core member 70 is configured to include an annular, generally planar peripheral portion 74; a circular, generally planar central portion 76, which portion is in a plane spaced from and extending substantially parallel to the plane of said peripheral portion 74; and a frusto-conical wall 78 interconnecting said peripheral portion 74 and said central portion 76. The jacket 72 of rubber-like material is cast in situ around the peripheral portion 74 and also around substantially all of the frustral conical wall 78. As the jacket 72 is being cast onto core member 70, some of the jacket material enters openings 80 and when the jacket hardens serves to interconnect one side of the jacket with the other, and in this manner the jacket 72 is securely fastened to the core member 70. The openings 80 are preferably circumferentially spaced around both the peripheral portions 74 and the wall 78, with the openings 80 in said wall 78 disposed between adjacent openings 80 in said peripheral portion 74, i.e. the two rows of openings 80 are preferably staggered around core member 70. A central opening 82 extends through the center of central portion 76 for the reception of bolt 44. A larger opening 84 in the jacket material only, on the outboard side of cap C', extends in concentric fashion around bolt opening 84 and serves as a depression to countersink the bolt head 60 or the nut 62, which ever be the case. As most clearly shown in FIG. 9, cap C' presents a smooth, generally planar outboard side 86 and a stepped, generally bi-planar inboard side 88. The part of central portion 76 that protrudes out from the jacket material serves to space the remaining portion of inboard side 88 out of substantial contact with the generally U-shaped yoke element 42. The peripheral edges of cap C' are fully rounded to prevent chafing of the net.

Figure 12:
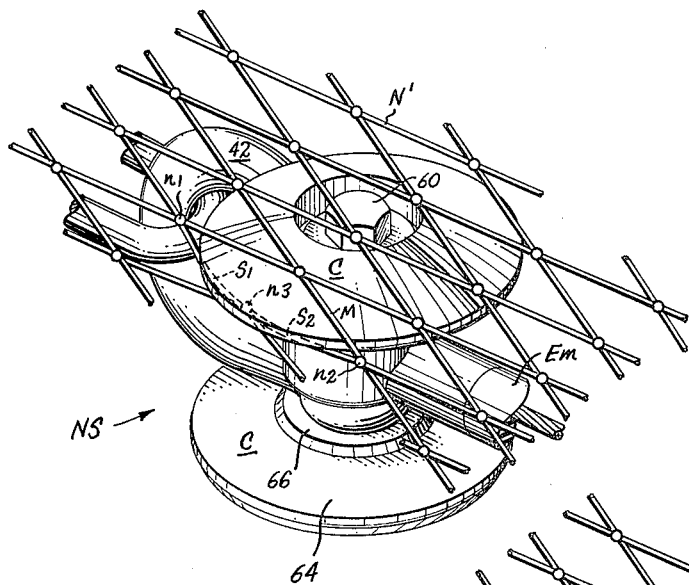
FIG. 12 is a fragmentary perspective view presenting an instantaneous showing of a net in moving contact with a shackle cap of the non-snagging shackle assembly of the present invention, such view showing a mesh of the net apparently commencing to snag on said cap.
Figure 13:
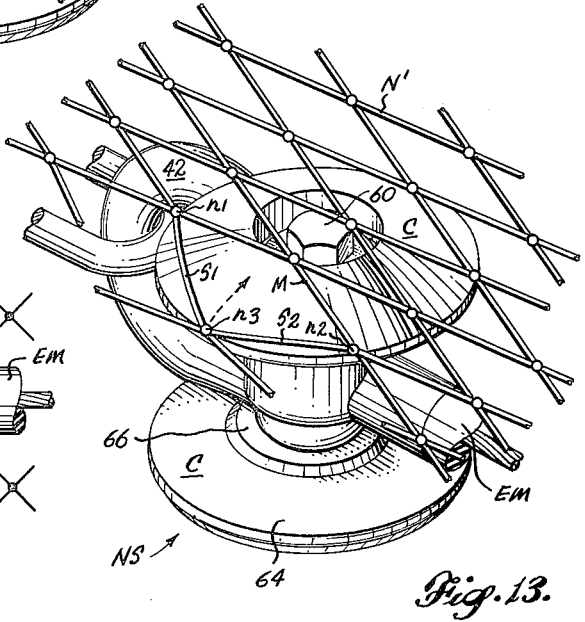
FIG. 13 is a fragmentary perspective view, similar to the view of FIG. 12, illustrating that upon additional relative movement of the net the mesh does not become snagged on the cap but rather is pulled free thereof.

Turning now to a consideration of FIGS. 12–15, FIG. 12 presents an instantaneous showing of netting N' in relative moving contact with a non-snagging shackle assembly NS according to the present invention, with one mesh M of said netting N' apparently tending to snag or catch on a peripheral portion of a cap C. FIG. 13, however, illustrates that with an additional relative motion in the same direction knots $n1$, and $n2$ of mesh M are drawn over the outer surface of cap C and the strands $s1$, $s2$ are in effect cammed by and over the smooth, rounded periphery of cap C until knot $n3$ is drawn over cap C. FIG. 15 illustrates netting N' as it appears when it is stretched in one direction and contracted in the crosswise direction, causing the individual meshes, one being designated M, to assume a generally elongated diamond shape. The view also serves to illustrate that cap C (or C') is constructed to have a diameter which is at least slightly larger than the longer dimension of such elongated meshes. The cap C constitutes a barrier to the meshes of the netting. Also, the maximum dimension across its mesh engageable surface, i.e. the arc length, is longer than said larger dimension of an elongated mesh. Thus, the knots (such as knots $n1$, $n2$ of FIGS. 12 and 13) at the ends of the elongated meshes always assume a position outside of the outboard surface of the cap and a mesh M always be cammed free, in a manner explained above.

From the foregoing, further variations, adaptations, modifications and characteristic features can be evolved by those skilled in the art to which the invention is addressed, within the scope of the following claims:

What is claimed is:

1. A non-snagging shackle coupler comprising a generally U-shaped yoke having a closed bight end and an open jaw end defined by and between terminal portions of spaced apart, arm-like extensions of said bight end, said terminal portions being formed to include axially aligned eye openings; a generally disk-shaped snag prevention cap means disposed immediately outboardly of at least one of said arm-like extensions, said cap possessing a diameter that is substantially larger than the width dimension of the terminal portion of the adjacent arm-like extension, said cap having a smooth outboard face, an inboard face, and a rounded edge extending between said outboard and said inboard faces, a central opening coaxially aligned with the eye opening in the adjacent armlike extension, and a well-like depression in said outboard side of the cap generally concentric with said central opening; a pin-like member insertable through all of said aligned openings; and means securing said pin-like member in said openings, with the well-like depression serving to countersink said means below the surface of the outboard side of said cap.

2. In combination, a connector element comprising a pair of spaced apart arms having rounded terminal portions defining an open jaw area therebetween, with coaxially aligned eye openings in said terminal portions; a generally disk-shaped element substantially larger in diameter than said rounded terminal portions, disposed immediately outboardly of at least one of said arms; said disk-shaped element having a central opening coaxially aligned with the eye opening of the adjacent terminal portion, and a depression in said outboard side generally concentric with said central opening; a pin-like member extending through all of said aligned openings; and retaining means on the respective ends of said pin-like member, with the depression in said cap serving to countersink one end of the pin-like member, including its retaining means, below the surface of the outboard side of the disk-shaped element.

3. The combination of claim 2, wherein said disk-shaped element comprises a metal core substantially covered on both sides and outboard of its peripheral edge by a jacket of wear-resistant material such as rubber, with said depression extending through the jacket material only.

4. The combination of claim 3, wherein a plurality of circumferentially spaced openings are provided in said metal core member in regions to be covered by said jacket, and some of the jacket material extends through said openings, connecting one side of said jacket to the other side.

5. In combination with a connector element having spaced apart arm members defining a jaw therebetween and coaxially aligned in the terminal end portions of said arm members, a generally disk-shaped snag prevention cap of substantial diameter disposed contiguous the outboard side of each arm member, said cap having a central opening coaxially aligned with the eye opening in the adjacent arm member, and a depression in said outer face arranged generally concentric with said central opening; a pin-like member extending through all of the aligned openings; and retaining means on each end of said pin-like member, with each said depression serving to countersink one end of the pin-like member, including its retaining means, below the surface of the outboard side of a cap.

6. The combination of claim 5, wherein said cap comprises a generally disk-shaped metal core substantially covered on both sides and outboard of its peripheral edge by a jacket of wear-resistant material such as rubber.

7. The combination of claim 6, wherein a plurality of openings are provided in portions of said metal core covered by said jacket and some of the jacket material extends through said openings from one side of said core to the other side thereof, for securely locking the jacket onto said metal core.

8. A fishing net installation comprising a fishing net of open mesh construction and at least one coupler assembly coupling a plurality of net elements together, wherein relative moving contact sometimes occurs between said net and said coupler assembly, and wherein said coupler assembly comprises a connector element having a pair of spaced apart arms defining an open jaw area therebetween, with coaxially aligned eye openings in said arms; a generally disk-shaped element disposed immediately outboard of at least the arm closest to the meshes of the fishing net, said element having a central opening coaxially aligned with the eye opening of the adjacent arm, and the diameter of said element being larger than the largest obtainable dimension of a mesh of the fishing net when the net is elongated in one direction and contracted in the crosswise direction; a pin-like member extending through all of said aligned openings; and retaining means on the respective ends of said pin-like member, countersunk substantially flush with the outboard surface of said element.

9. The combination of claim 8, wherein said disk-shaped element comprises a metal core substantially covered on both sides and outboard of its peripheral edge by a jacket of wear-resistant material such as rubber.

10. A fishing net installation comprising a fishing net and at least one coupler assembly coupling a plurality of net elements together, wherein relative moving contact sometimes occurs between the meshes of said fishing net and said coupler assembly, and wherein said coupler assembly comprises a generally U-shaped yoke having a closed bight end and an open jaw end defined by spaced apart, arm-like extensions of said bight end, with axially aligned eye openings in the terminal portions of said arm-like extensions; a generally disk-shaped cap of substantial diameter disposed immediately outboard of at least the arm-like extension closest to the meshes, said cap having a central opening coaxially aligned with the eye opening in the adjacent arm-like extension, and a diameter larger than the largest inside dimension of a mesh of the net obtainable by stretching the net in one direction and contracting it in the cross-wise direction; a pin-like member insertable through all of said aligned openings; and means securing said pin-like member in said openings, said means being countersunk at least flush with the outboard face of said cap, with the cap preventing chafing and snagging of meshes of the fishing net by said coupler assembly.

11. The combination of claim 10, wherein said disk-shaped element comprises a metal core substantially covered on both sides and outboard of its peripheral edge by a jacket of wear-resistant material such as rubber.

12. The combination of claim 11, wherein a plurality of circumferentially spaced openings are provided in said metal core in regions thereof covered by said jacket, and wherein some of the jacket material extends through said openings, connecting one side of said jacket to the other side thereof, for securely locking the jacket onto said metal core.

References Cited by the Examiner

UNITED STATES PATENTS

| | | | |
|---|---|---|---|
| 251,464 | 12/1881 | Rogers. | |
| 1,699,953 | 1/1929 | Conant | 264—273 |
| 1,724,394 | 8/1929 | Chamberlain. | |
| 2,678,585 | 5/1954 | Ellis | 85—50 |
| 2,709,616 | 5/1955 | Larson et al. | 59—86 XR |
| 2,771,262 | 11/1956 | Laystrom | 85—50 |
| 3,013,356 | 12/1961 | Luketa | 43—9 |
| 3,018,581 | 1/1962 | Luketa | 43—9 |

FOREIGN PATENTS

| | | |
|---|---|---|
| 425,993 | 4/1911 | France. |
| 212,668 | 3/1924 | Great Britain. |
| 331,363 | 7/1930 | Great Britain. |
| 438,977 | 11/1935 | Great Britain. |

ABRAHAM G. STONE, *Primary Examiner.*

F. RAY CHAPPELL, *Examiner.*